2,802,745

METHOD OF PRODUCING ARTIFICIAL SAUSAGE CASINGS AND PRODUCT PRODUCED THEREBY

Richard Bösel, Fallingbostel, near Walsrode, Germany

No Drawing. Application December 2, 1954,
Serial No. 472,762

Claims priority, application Germany December 31, 1953

4 Claims. (Cl. 99—176)

This invention relates to a method of producing synthetic sausage casings.

As substitute for natural casings, it is known to produce synthetic sausage casings from cellulose hydrate, cellulose glycolic acid salts, skin and flesh fibres, parchment paper, paper impregnated with gelatine, and other suitable starting materials.

The synthetic casings formed without fibrous structure from cellulose hydrate, cellulose glycolic acid salts, and similar substances not containing albumin, have the disadvantage that they are not prickproof and are unsuitable for raw sausage and scalded sausage meat in consequence of their imperfect shrinkage and adhesion to these two kinds of sausage.

The present invention aims at improving such structureless synthetic sausage casings so that they also satisfy the requirements for scalded and long-keeping sausages and are capable of being used not only for the production of cooking sausage, as are the known synthetic casings of cellulose hydrate, but also for filling with raw sausage and scalded sausage meat.

This object is achieved in a simple manner, according to the invention, by incorporating, when producing structureless synthetic casings from cellulose hydrate, cellulose glycolic acid salts and similar non-albuminous starting substances, vegetable or animal or both vegetable and animal albuminous substances, such as for example gelatine, blood plasma, casein, soya flour, in a finely divided form and in moderate proportions, in the paste, for example of viscose, to be spun into skin. When non-aqueous solutions are used, for example collodion cotton in ether alcohol, as spinning paste, the albumin may be completely or partially replaced, in accordance with the invention, by water-soluble inorganic salts, such as ammonium sulphate or common salt.

For the purpose of carrying out the hereindescribed method in detail, the albuminous substances and/or the inorganic salts are either suspended in the paste to be formed into skin, or they are dissolved in said paste, such as casein in viscose for example, or they are added to the paste in dissolved form. The spinning paste prepared in this manner is spun in a precipitating bath in known manner into a skin, which is further treated and finished in the usual manner. If hardenable albuminous substances are used, it is advisable additionally to subject the synthetic casing to the action of a hardening agent, such as formaldehyde, which is advantageously added to the usual softener bath. It is moreover advantageous for the albuminous substances or inorganic salts used in finely distributed form in accordance with the invention, to have a particle size of 0.1 millimetre diameter at most.

The synthetic casings obtained by the hereindescribed method, consist of a non-albuminous structureless frame or carrier substance, for example of cellulose hydrate or cellulose glycolic acid salts, which, when albuminous substances are added to the spinning solution, contains these substances embedded in fine distribution and which, when water-soluble inorganic salts are added to the paste, has a rough surface, caused by the dissolving out of the salts during the precipitation process, provided with the finest small bubbles. These synthetic casings are prick-proof and are suitable, in consequence of their improved adhesion and increased shrinkage properties, for the production of long-keeping and scalded sausage as well, and they retain their unobjectionable nature even after long storage. The quantity of albuminous substances and/or inorganic salts to be added to the spinning paste is preferably selected to be 50% at most, referred to the basic substance of the casing.

The invention will be illustrated by the following examples:

Example 1

2 grams of gelatine to each 100 grams of paste are finely and uniformly distributed by stirring in a 17% solution of collodion cotton in ether alcohol. The gelatine has previously been crushed so fine that it passes through a sieve of 0.1 millimetre mesh width. The paste thus prepared is spun in known manner by means of an annular nozzle and an aqueous precipitating bath containing 18% of methanol into a skin, which is then denitrated for instance by means of sodium sulph-hydrate, and washed. For the purpose of hardening the gelatine, 7% of formaldehyde is added to the softener bath, which consists of a 20% aqueous glycerine solution. After passage through the softener bath, the synthetic casing obtained is dried in the usual manner.

Example 2

The procedure described in Example 1 is modified in that, instead of 2 grams of gelatine, an amount of 2 grams of crushed ammonium sulphate per each 100 grams of paste is incorporated in the spinning paste, and in this case treatment of the casing with a hardener is unnecessary.

Example 3

1% of pre-swollen gelatine is stirred into a viscose formed from 7% of cellulose and 6% of alkali, and the spinning paste thus prepared is shaped by means of an annular nozzle into the form of a tube and solidified by means of a coagulating bath containing 10% of sodium sulphate and 20% of ammonium sulphate and finished by the known method.

The synthetic casings produced in accordance with the foregoing examples are prick-proof and well suited for the production of long-keeping and scalded sausage. A synthetic casing produced for comparison without the additions indicated in the examples separates from the sausage meat shortly after being filled, with the result that the sausage becomes unsightly.

Having thus described and ascertained the nature of my invention, I declare what I claim is:

1. In a method of producing non-fibrous synthetic sausage casings from film-forming solutions of cellulose derivatives by extruding the film-forming solution into a liquid coagulating medium to form the sausage casing as an endless tube, the step which comprises stirring proteins selected from the group consisting of gelatine, blood plasma, casein and soya flour, in finely divided form, with a particle-size of a diameter not exceeding 0.1 millimeter and in moderate proportion not exceeding 50% of the weight of the cellulose derivative component of the casing, into a film-forming solution of a cellulose derivative in which the protein is insoluble.

2. A method as claimed in claim 1, in which the quantity of finely divided protein selected from the group consisting of gelatine, blood plasma, casein and soya flour in amounts of 2 grams per each 100 grams of the starting solution of a cellulose derivative.

3. A synthetic sausage casing consisting of cellulose hydrate as basic substance and containing in its wall finely divided proteins selected from the group consisting of gelatine, blood plasma, casein and soya flour with a particle size of a diameter not exceeding 0.1 millimeter and in moderate proportions not exceeding 50% of weight referred to the basic substance.

4. A synthetic sausage casing as claimed in claim 3, containing in its wall 2 grams protein selected from the group consisting of gelatine, blood plasma, casein and soya flour per each 100 grams basic substance.

References Cited in the file of this patent

UNITED STATES PATENTS

| | | |
|---|---|---|
| 1,158,400 | Cohoe | Oct. 26, 1915 |
| 1,903,622 | Henderson | Apr. 11, 1933 |
| 1,978,774 | Voss et al. | Oct. 30, 1934 |
| 2,144,900 | Smith | Jan. 24, 1939 |
| 2,627,466 | Lewis | Feb. 3, 1953 |